Patented June 12, 1945

2,378,290

UNITED STATES PATENT OFFICE 2,378,290

PROCESS OF PREPARING OXIDE GELS

Leonard C. Drake, Wenonah, and Louis P. Evans, Woodbury, N. J., assignors to Socony-Vacuum Oil Company, Incorporated, New York, N. Y., a corporation of New York No Drawing. Application March 14, 1941, Serial No. 383,356

2 Claims. (Cl. 252—317)

This invention relates to the preparation of oxide gels, and is concerned particularly with a novel method of producing oxide gels from readily hydrolyzable liquid salts.

Inorganic oxide gels, e. g., those of the elements of groups III and IV of the periodic system capable of forming gels, are often prepared on a commercial scale for various uses, such as catalysts, contact materials in general, etc. Therefore, it is desirable to produce the gels from the cheapest and most convenient source of the element or elements in question. In the case of some elements this cheapest and most convenient source is a readily hydrolyzable liquid salt, wherefore it cannot be dispersed by conventional procedure in an aqueous medium for precipitating the gel without premature hydrolysis. This is true, for instance, when it is attempted to use titanium tetrachloride for the preparation of gels comprising titanium oxide. However, dispersion of some sort is necessary in order to obtain gels of proper colloidal structure and homogeneity.

Accordingly, it is an object of our invention to provide a novel process of preparing oxide gels. A more specific object is to afford a process of producing oxide gels from a readily hydrolyzable liquid compound, so as to prevent premature hydrolysis of the liquid compound.

We have discovered that a liquid compound, as for example, titanium tetrachloride, of the element to be precipitated as an oxide gel may be introduced into the aqueous precipitating solution in vapor form to produce the desired gel of excellent amorphous structure without obtaining premature hydrolysis of the liquid compound.

In practice we have found the simplest and most effective method of introducing the liquid compound involves the use of an inert vapor carrier. Thus, for example, dry air or nitrogen may be bubbled through the liquid compound and the resulting vaporous or gaseous mixture containing the liquid compound passed into the aqueous precipitating solution. An additional advantage afforded by our process results from the fact an exact and close control on the rate of precipitation can be had conveniently by regulating the carrier gas rate or the temperature (and, therefore, the vapor pressure of the liquid compound) or both.

The aqueous precipitating solution should be maintained in a well-agitated state in order to insure intimate vapor-liquid contact, and when this is done, we have found the liquid compound, e. g., $TiCl_4$, is absorbed quantitatively and uniformly by the precipitating bath. In the manufacture of mixed gels, other salts may be present in the aqueous solution, which then are co-precipitated with the titanium oxide, or other oxide derived from a readily hydrolyzable liquid, which is introduced in vapor form. In this way, for instance, various silicates, aluminates, or alumino-silicates of titanium can be prepared.

Therefore, it is to be noted that our invention affords an efficient method of preparing titanium oxide gels from titanium tetrachloride which is the cheapest and most convenient source of titanium. It also is to be understood, as indicated above, that other oxide gels may be prepared by the process, as for example, silica gels from silicon tetrachloride or stannic oxide gels from stannic tetrachloride or, in fact, oxide gels in general from liquid compounds.

In order to illustrate the invention further, the following examples are given:

Example I 180 parts by weight of water glass (containing 50 parts $SiO_2$) were dissolved in 1,000 parts by weight of water. Titanium tetrachloride, maintained at 210° F., was swept into the above solution with a slow stream of dried nitrogen during which time the solution was violently agitated. The nitrogen rate was adjusted so that all the $TiCl_4$ introduced into the solution was absorbed before it reached the surface of the solution, and the introduction of the $TiCl_4$ was continued until the solution was neutral to litmus. The resulting co-precipitated $TiO_2$ and $SiO_2$ was then recovered, washed and dried.

Example II 20.3 parts by weight of $Na_2Al_2O_4$ and 26.4 parts by weight of water glass (containing 7.4 parts of $SiO_2$) were dissolved in 1,400 parts by weight of water. $TiCl_4$ was then added to the solution as in Example I until the solution was neutral to litmus. This required 17.7 parts by weight of $TiCl_4$. The mixed oxides which co-precipitated were then recovered, washed and dried.

We claim:

1. The process for producing a composite inorganic oxide gel of silica and titania which comprises agitating an aqueous solution of sodium silicate, passing a stream of dry air through titanium tetrachloride to form a mixture of air with a substantial proportion of titanium tetrachloride vapor, passing said mixture into said agitated solution to effect joint precipitation of silica and titania as a composite oxide gel, continuing passage of said mixture into said solution until the latter is substantially neutral to litmus, and thereafter washing and drying said composite oxide gel.

2. The process for producing a gel of silica and titania which comprises agitating an aqueous solution of sodium silicate, passing a stream of a dry inert vapor carrier through titanium tetrachloride to form a mixture of said carrier with a substantial proportion of titanium tetrachloride vapor, passing said mixture into said agitated solution to effect joint precipitation of silica and titania as a composite oxide gel, continuing passage of said mixture into said solution until the latter is substantially neutral to litmus, and thereafter washing and drying said composite oxide gel.

LEONARD C. DRAKE.
LOUIS P. EVANS.